US012446559B2

(12) United States Patent
Frumkin

(10) Patent No.: US 12,446,559 B2
(45) Date of Patent: Oct. 21, 2025

(54) SPREADING DEVICE TRAWL DOOR WITH AT LEAST FOUR FOILS WITH EDGES THAT ALIGN ON A COMMON CENTER POINT

(71) Applicant: THYBORØN SKIBSSMEDIE A/S, Thyborøn (DK)

(72) Inventor: Jacob Frumkin, Thyborøn (DK)

(73) Assignee: THYBORØN SKIBSSMEDIE A/S, Thyborøn (DK)

( * ) Notice: Subject to any disclaimer, the term of this patent is extended or adjusted under 35 U.S.C. 154(b) by 0 days.

(21) Appl. No.: 18/853,734

(22) PCT Filed: Mar. 28, 2023

(86) PCT No.: PCT/DK2023/050059
§ 371 (c)(1),
(2) Date: Oct. 3, 2024

(87) PCT Pub. No.: WO2023/193855
PCT Pub. Date: Oct. 12, 2023

(65) Prior Publication Data
US 2025/0221391 A1    Jul. 10, 2025

(30) Foreign Application Priority Data

Mar. 31, 2022   (DK) .............................. PA202270279
Apr. 4, 2022    (DK) .............................. PA202270181

(51) Int. Cl.
*A01K 73/045* (2006.01)
(52) U.S. Cl.
CPC .................................. *A01K 73/045* (2013.01)
(58) Field of Classification Search
CPC .................................................. A01K 73/045
See application file for complete search history.

(56) References Cited

U.S. PATENT DOCUMENTS 4,890,568 A * 1/1990 Dolengowski .......... B63B 21/66
114/163
5,357,892 A * 10/1994 Vatne ................... A01K 73/045
114/244

(Continued)

FOREIGN PATENT DOCUMENTS

CA          736 170 A      6/1966
CN        105766819 A      7/2016
(Continued)

OTHER PUBLICATIONS

International Search Report for PCT/DK2023/050059, mailed on Jun. 14, 2023.

(Continued)

*Primary Examiner* — Jessica B Wong
(74) *Attorney, Agent, or Firm* — Schmeiser, Olsen & Watts, LLP

(57) ABSTRACT

A spreading device is provided for trawl fishing, seismic survey operations and other water activities where it is desirable to keep distance between two sides of a towed device, the spreading device having at least one section, where each section has at least four foils, in use an inner set of foils comprising at least a first forward foil and a first rearward foil and an outer set of foils comprising at least a second forward foil and a second rearward foil, where all foils have a front surface and a rear surface, the surfaces each being defined by a front edge and a rear edge and two side limitations, where the front edge of the first forward foil and the front edge of the second forward foil are arranged on a first radial extending from a fictive center.

10 Claims, 3 Drawing Sheets

(56) References Cited

U.S. PATENT DOCUMENTS

| | | | | |
|---|---|---|---|---|
| 6,267,070 | B1* | 7/2001 | Russell | B63B 21/66 114/244 |
| 9,474,256 | B2* | 10/2016 | Josafatsson | A01K 73/045 |
| 2010/0126057 | A1* | 5/2010 | Safwat | A01K 73/045 43/9.7 |
| 2014/0202061 | A1* | 7/2014 | Josafatsson | G01V 1/3826 114/244 |
| 2018/0325086 | A1* | 11/2018 | Mueller | A01K 73/045 |
| 2022/0295767 | A1* | 9/2022 | Baungaard | A01K 73/045 |
| 2024/0149984 | A1* | 5/2024 | Stausholm Andreasen | A01K 73/045 |

FOREIGN PATENT DOCUMENTS

| | | |
|---|---|---|
| EP | 3183959 A1 | 6/2017 |
| GB | 2161351 A | 1/1986 |
| WO | 82/02646 A1 | 8/1982 |
| WO | 2008/129068 A1 | 10/2008 |
| WO | 2018054443 A1 | 3/2018 |
| WO | 2020/254896 A1 | 12/2020 |
| WO | 2021/104591 A1 | 6/2021 |

OTHER PUBLICATIONS

Written Opinion for PCT/DK2023/050059, mailed on Jun. 14, 2023.
Danish Search Report for PA 2022 70181, dated Oct. 7, 2022.

\* cited by examiner

SPREADING DEVICE TRAWL DOOR WITH AT LEAST FOUR FOILS WITH EDGES THAT ALIGN ON A COMMON CENTER POINT

CROSS-REFERENCE TO RELATED APPLICATIONS

This application is a national stage of PCT Application No. PCT/DK2023/050059, having a filing date of Mar. 28, 2023, which is based on DK Application No. PA 2022 70279, having a filing date of May 31, 2022 and DK Application No. PA 2022 70181, having a filing date of Apr. 4, 2022, the entire contents all of which are hereby incorporated by reference.

FIELD OF TECHNOLOGY

The following relates to a spreading device typically used for trawl fishing, seismic survey operations or other water activities where it is desirable to keep distance between two sides of a towed device. This device may be a trawl or seismic equipment, but for the remainder of the description reference will be made to trawl applications and it is clear that the skilled person will recognize the advantages of embodiments of the present invention and therefore also be able to apply them in other technical fields where it is desirable to create a distance between two sides of a towed device.

BACKGROUND

In the conventional art it is well-known to use trawl doors when fishing with the special type of fishing equipment called trawls. The trawl doors come in sets to be used one on the port side and one on the starboard side of the trawl. The trawl doors are designed such that although they are being pulled by the vessel in a determined direction along a centre line the design of the trawl door and the mounting of the trawl door on the trusses leading to the vessel will cause the trawl door also to move laterally as the trawl doors are pulled through the water, thereby creating a spreading force keeping the net open.

This lateral movement determines the opening capability of the trawl and thereby the area which the trawl is able to fish as it is being pulled through the water.

In CA736170 is suggested a trawldoor with a construction which increases the lateral force and minimizes the resistance against pull. In this disclosure the eddies created when pulling the trawldoor through the water was identified as causing unwanted drag. By arranging foils in an inner and outer constellation. Inner being descriptive of the foil closest to the trawl during operation. By designing the inner foil in a particular way and providing three outer foils this construction overcame the problems related to the creation of eddies, and hence reduced the drag. However the spreading force may still be improved.

It is desirable to be able to control the spreading force and at the same time obtain a substantial spreading force in order to keep the mouth of the trawl net open, but on the other hand it is also desirable to minimize the drag caused by the trawl doors as this drag requires extra pulling force and thereby more energy which in turn results in elevated fuel consumption and thereby elevated costs.

SUMMARY

An aspect relates to a compromise where a high degree of lateral spreading force is achieved, but only a minimum of drag is caused by the trawl doors during operation.

In the conventional art the spreading force is called the lift coefficient (Cl), and the angle of attack which indicates the angle at which the trawl doors should be arranged relative to the drag direction is also an important factor. Furthermore, another characteristic of the trawl doors is the drag coefficient (Cd) which is an indication of how much force is necessary in order to tow the trawl door through the water. These properties may be measured and this gives the skilled person a clear indication of the properties of a given trawl door.

In order to address the task mentioned above namely increasing the spreading force without increasing the drag coefficient and still maintain a stable travel of the trawl door through the water embodiments of the present invention provides a spreading device for trawl fishing, seismic survey operations and other water activities where it is desirable to keep distance between two sides of a towed device, the spreading device having at least one section, where each section has at least four foils, in use an inner set of foils comprising at least a first forward foil and a first rearward foil and an outer set of foils comprising at least a second forward foil and a second rearward foil, where all foils have a front surface and a rear surface, the surfaces each being defined by a front edge and a rear edge and two side limitations, where the front edge of the first forward foil and the front edge of the second forward foil are arranged on a first radial extending from a fictive center where the rear edge of the first forward foil and the rear edge of the second forward foil are arranged on a second radial extending from the fictive center and where the front edge of the first rearward foil and the front edge of the second rearward foil are arranged on a third radial extending from the fictive center and where the rear edge of the first rearward foil and the rear edge of the second rearward foil are arranged on a fourth radial extending from the fictive center.

In the context of embodiments of the present invention, the formulation "in use and inner set of foils" shall be understood as meaning that in use when two spreading devices are used in order to keep the item spread out, for example the sides of a trawl net are spread out due to the lateral component (relative to the direction of pull) of the action created by the spreading device, "inner" shall be understood as the side of the device facing towards the other spreading device, and thereby towards the item to be towed. Likewise, "outer set of foils" shall be understood as the foils facing away from the other spreading device.

Tests have surprisingly indicated that the specific geometrical configuration where foils in the inner and outer sets are arranged such that their front and rear edges are on common radials provides substantially better spreading force together with lower drag coefficients. The ratio between the spreading force and drag coefficient is a clear indicator of improved performance of a spreading device of this type.

Up to the present time, conventional art devices have claimed spreading force values up to 4.5 or 4.6 for the best performing spreading devices, but spreading devices designed and recited above in test provide spreading force coefficients which are 5-10% better than the best of the conventional art devices and at the same time have lower drag coefficients. These measurements are naturally carried out at comparable angles of attack and as such it is the arrangement of the foils according to the scheme indicated above that provides the special characteristics and advantages of embodiments of the present invention.

In an embodiment of the invention the combined angle α between the first radial (R1) and the second radial (R1') and the angle β between the third radial (R2) and the fourth radial (R2') is larger than the angle μ between the first radial (R1) and the fourth radial (R2'). With this relationship between the angles it is ensured that the foils overlap and as such channels are created between adjacent foils through which the water's velocity increases as the spreading device is pulled through the water. This increase in velocity also helps to create extra lift, i.e. more spreading force, for the spreading device as such.

In an embodiment of the invention the inner set of foils and/or the outer set of foils each comprises one or more intermediate foils, where the front and rear edges of intermediate foils of the inner set of foils and the outer set of foils are arranged on common radials (Rc, Rc') extending from the fictive center (C) through front and rear edges respectively.

Tests with spreading devices having intermediate foils in addition to the foremost and rearmost foils as described above indicate that the spreading force may be improved without increasing the drag coefficient.

A embodiment of the invention discloses that a front part of the foremost intermediate foil is overlapped by a rear part of the first or second forward foils, where a rear part of an intermediate foil overlaps a front part of either the first or second rearward foils. With this embodiment further channels are created by the intermediate foils and the foremost and the rearmost foils such that more channels for speeding up the water velocity as the spreading device travels through the water are created whereby increased lift is created over the intermediate foils as well.

In an embodiment, the rearward foil or part of the rearward foil of the outer set of foils is pivotable about an axle provided along the rear edge of the rearward foil, where the pivotable action of the rearward foil or the section of the rearward foil may be controlled by an actuator. By being able to pivot a section or an entire foil it is possible to alter the characteristics of the spreading device in a radical manner in that the pivoting of the foil will create a completely different water flow through the spreading device as compared to a spreading device where the foils are fixed. This adjustment may be used in order to increase or decrease the spreading force or reduce the drag coefficient particularly as the angle of attack may be changed, i.e. may be more or less arranged at an angle relative to the towing direction of the vessel. Also, in order to adjust the spreading force dependent on the vessel's velocity through the water, it is advantageous to be able to adjust the trawl doors characteristics. In this manner it is possible to adjust the spreading device to special conditions such that the spreading devices may be used in a variety of water conditions, simply by adjusting a foil or foil section.

Other embodiments foresee that similar adjustment possibilities as discussed above are also provided on the innermost foils or on both inner and outer foils.

In a still further advantageous embodiment, the foils or at least some of them are arc shaped. By providing a curvature to the foils it is achieved that water at a certain velocity passing the arc-shaped foil will generate lift comparable to lift created by air passing an aircraft wing in aerodynamics, and as such the arc-shape will to a certain degree determine how much lift may be generated by each and every foil.

In order to further enhance the characteristics of the spreading device a further embodiment of the invention foresees that one or more foils, not being the first or second forward foils, are provided with a bulb 52 on a surface facing away from the fictive center C, where the foremost part of the bulb 52 is arranged at a distance corresponding to between 5% and 15% of the length between the front edge and rear edge of the foil, measured from the front edge of the foil.

The inventor has already applied this concept to another type of spreading device and it has surprisingly turned out that the same advantages are achieved by implementing the bulb on foils of the present invention as was the case with the former invention. The former invention is disclosed and discussed in WO2018054443 which is hereby incorporated by reference.

In a still further embodiment, the angle π between a first axis passing through the leading edge of the outer foremost foil and the rear edge of the inner rearmost foil and a second axis passing through the rear edge of the inner rearmost foil and the rear edge of the outer rearmost foil is between 70° and 110°.

In a further advantageous embodiment a first cord is defined as passing through the foremost edge of the first forward foil and the rear edge of the first rearward foil, and a second cord passing through the forward edge of the second forward foil and the rearward edge on the second rearward foil, where the angle between the first and second cords may be +/−20° relative to the cords being parallel.

In this embodiment by varying the angle between the two arrays of foils it is possible to alter the flow through the device substantially, without influencing the flow past, through and by the separate foils as already discussed above.

The channel created in the spreading device between the inner and outer set of foils creates the main water throughfare and as such it is important that the channel created between the inner and outer set of foils is dimensioned such that it decreases the drag, but at the same time maintains or even increases the spreading force. Therefore, it is important to design the spreading device within the limits as set out in the embodiment mentioned here. Furthermore, it is important to provide sufficient distance between the inner and outer foils such that they do not influence each other, or at least influences each other as little as possible. Naturally, there is a limit to the size of the channel, as the spreading device must also be compact enough in order for practical handling aboard a vessel.

Above the invention has been disclosed with respect to embodiments where equal number of inner and outer foils are present. It is however also contemplated that embodiments of the invention may be realized with different number of foils in the inner and outer set of foils, such as for example the outer set of foils comprises four foils whereas the inner set of foils only comprise three foils, or any other conceivable combination of number of foils in the inner or outer sets of foils.

BRIEF DESCRIPTION

Some of the embodiments will be described in detail, with references to the following Figures, wherein like designations denote like members, wherein.

Figure 7:
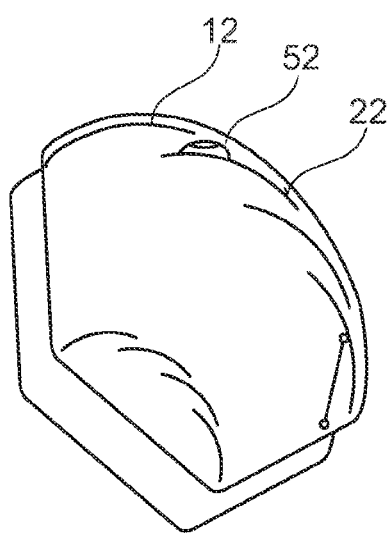
Figure 8:
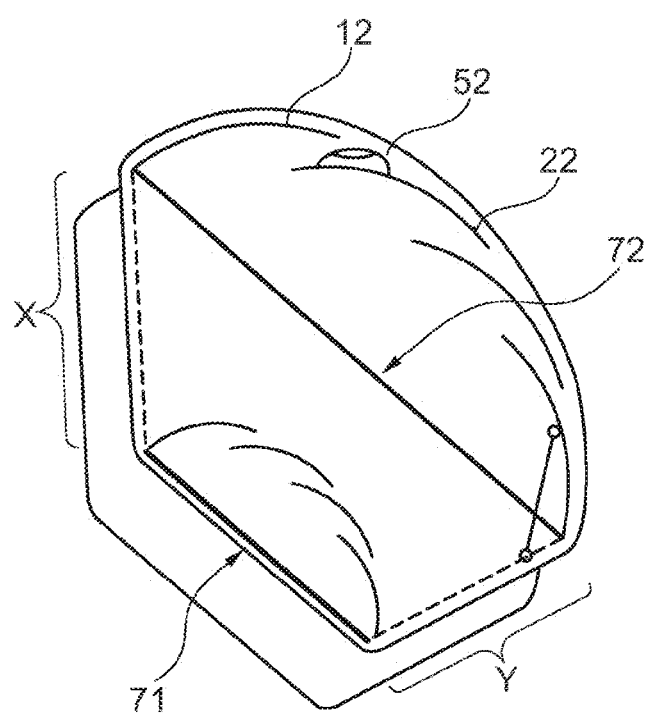

FIG. 7 illustrates a cross section through a trawl door according to embodiments of the present invention where some or all of the features explained above are incorporated into the trawl door but additionally a bulb 52 is illustrated mounted on an intermediate foil 22; and FIG. 8 illustrates a cross section through a trawl door according to embodiments of the present invention where cord lines are indicated.

DETAILED DESCRIPTION

Figure 1:
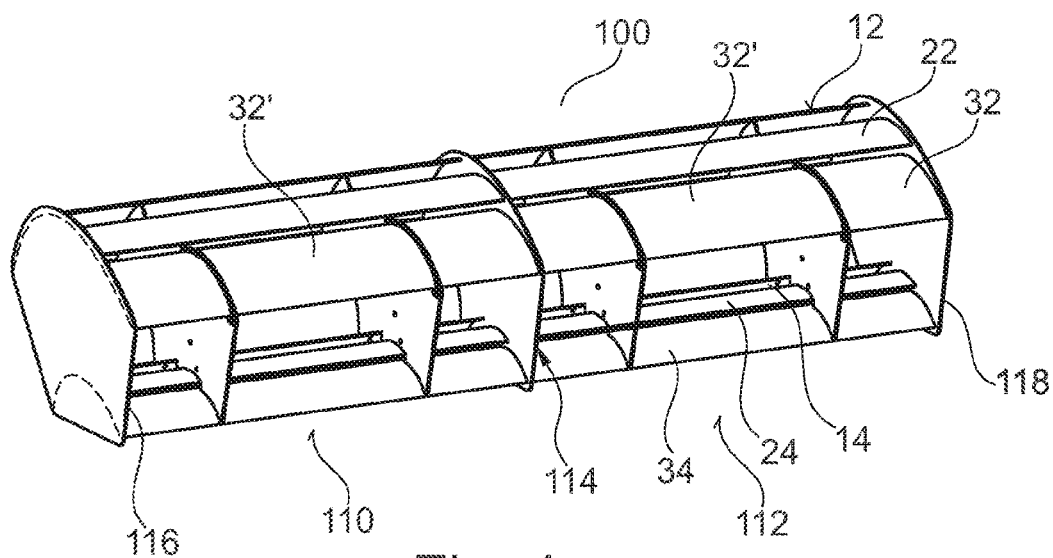
FIG. 1 illustrates an example of a trawl door 100 according to embodiments of the present invention.
Figure 5:
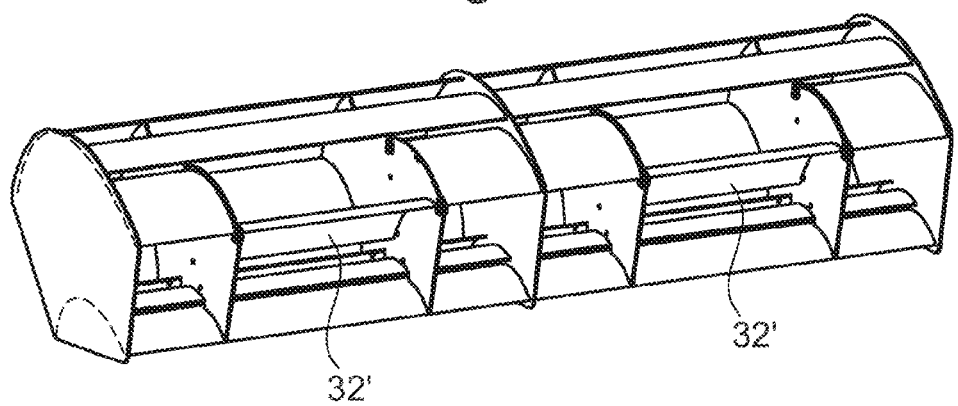
FIG. 5 illustrates an example of a trawl door 100 according to embodiments of the present invention.
Figure 6:
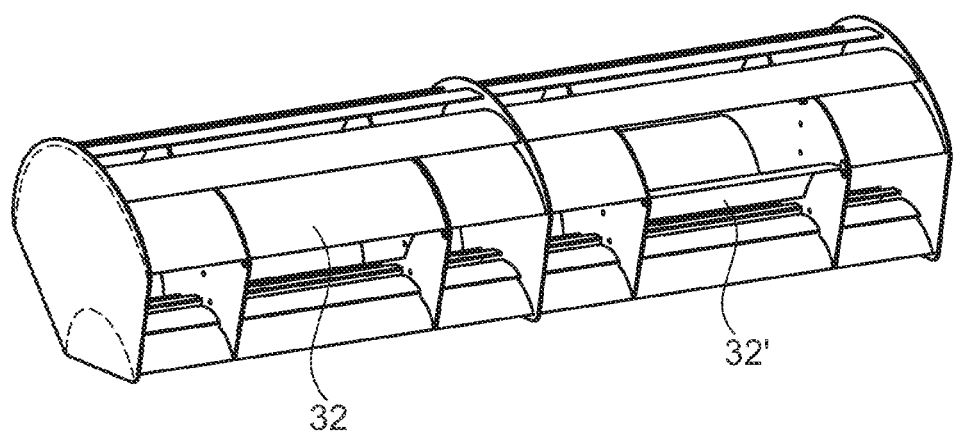
FIG. 6 illustrates an example of a trawl door 100 according to embodiments of the present invention.

In FIGS. 1, 5 and 6 an example of a trawl door 100 according to embodiments of the present invention is illustrated. The trawl door comprises two sections 110, 112 which in this example are identical. The sections are connected by a central bulkhead 114 and in opposite ends the trawl door is limited by upper and lower bulkheads 116, 118. Each section comprises a number of foils arranged as an inner set of foils 14,24,34 and an outer set of foils 12,22,32.

Figure 2:
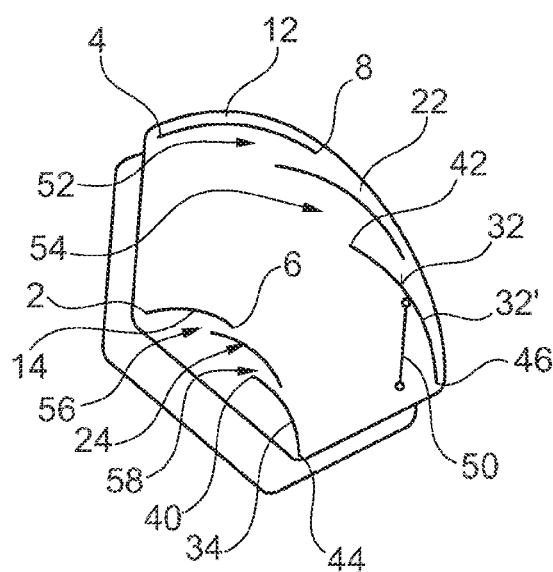
FIG. 2 illustrates a cross section through a section 110, 112.

Turning to FIG. 2, a cross section through a section 110,112 as illustrated in FIG. 1 is depicted. As may be seen the inner set of foils 14,24,34 is arranged at a distance from the outer set of foils 12,22,32. Each foil is defined by a front and rear edge where the foremost inner foil 14 has a forward edge 2 and a rearward edge 6. The corresponding outer foil 12 has a forward edge 4 and a rearward edge 8. Likewise, the inner rearmost foil 34 has a front edge 40 and a rear edge 44 and the outer corresponding rearmost foil 32 has a forward edge 42 and a rearward edge 46.

Figure 3:
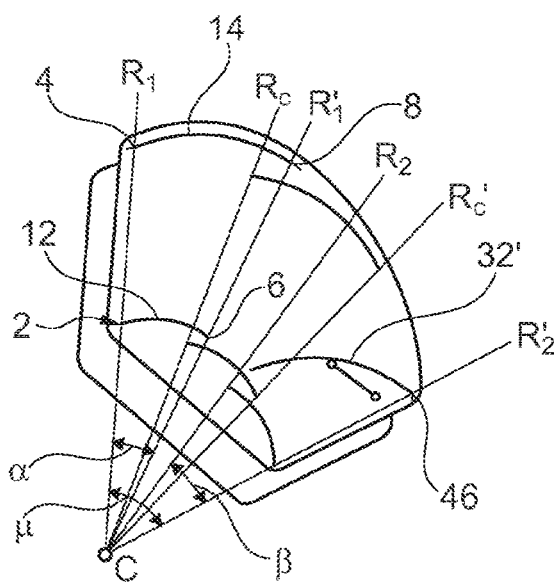
FIG. 3 illustrates that the corresponding edges of inner foils are arranged at the same radial as the same/corresponding outer foil.

With reference to FIG. 3, it may be seen that the corresponding edges of inner foils are arranged at the same radial as the same/corresponding outer foil. In FIG. 3 the forward edge 2 of the inner foil 14 is arranged on a radial R1 which passes through a fictive centre C. The outer foremost foil 12 has its forward edge 4 arranged on the same radial R1 and correspondingly the rear edges 6,8 of the inner and outer foils 12,14 are arranged on a second radial R1' which also passes through the fictive centre C. Likewise with respect to the further foils 22,32,24,34 it may be seen that the forward edges are arranged on further radials R2,RC and the rear edges are arranged on corresponding radials R2', RC'.

In the embodiment depicted in FIGS. 1, 2 and 3, a section 32' of the rearmost outer foil 32 is arranged such that it may pivot around the rear edge 46. In FIG. 2 is illustrated a position where the rearmost foil 32 and the section 32' are flush whereas in FIG. 3 is indicated a position where the section 32' is pivoted around the rear edge 46 of the rearmost outer foil 32. This pivotal action is indicated as being carried out by the activation of an actuator 50 which is connected to the trawl door and the (pivotable) section 32'.

Turning back to FIG. 3, it is indicated that the angle μ between the radial R1 and the radial R2' is larger than the angle α between the radial R1 and R1' combined with the angle β between the radial R2 and R2'. It is clear that if there had not been any intermediate foils 22,24 present, the foils 12,32 and 14,34 would not overlap, but due to the provision of intermediate foils arranged at appropriate angles between the radials an overlap between the foils is achieved. This in turn creates channels 52,54 between adjacent foils. These channels will channel water, during use through the channels 52,54,56 and 58 in such a manner that the velocity of the water forced through the channels will be higher than the general velocity of water passing the trawl door and as such an increased lift will be created on the foils comparable to the lift created on airplane wing due to the aero dynamic design of the airplane wing.

Figure 4:
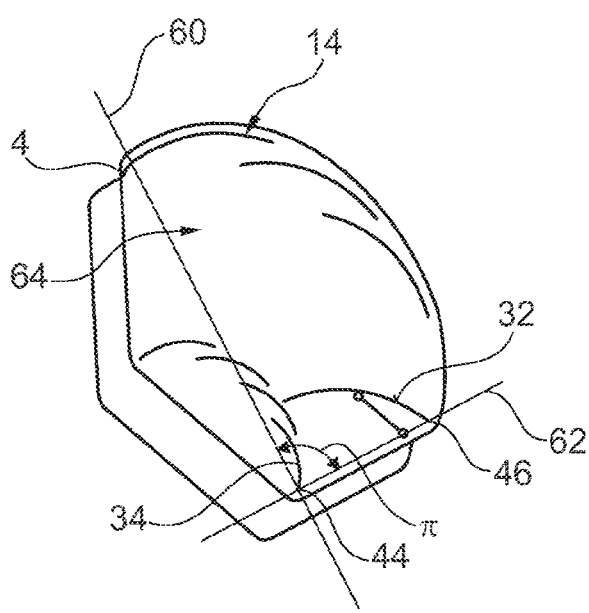
FIG. 4 illustrates a cross section of a trawl door similar to the cross sections illustrated in FIGS. 2 and 3.

In FIG. 4, a cross section of a trawl door is indicated similar to the cross sections illustrated in FIGS. 2 and 3. As may be seen by the dashed lines 60,62, the dashed lines 60,62 design first and second curves along which the inner foils and outer foils are arranged. In this manner a relatively unhindered throughfare 64 is created through which a substantial amount of water may pass during use. By being able to adjust/pivot sections 32' as described above it is possible to direct the water in the throughfare in different directions thereby altering the characteristics of the trawl door.

Turning back to FIG. 1 and FIGS. 5 and 6, examples of trawl doors according to embodiments of the invention are illustrated where the pivotable sections are operated in various positions. In FIG. 1 the pivotable section 32' is in a position similar to the position of the section 32' illustrated in FIG. 2. In FIG. 5, the pivotable section 32' has been brought to a position similar to the position illustrated with reference to FIGS. 3 and 4 where the actuator (not illustrated) has pivoted the section 32' into a position as illustrated with reference to FIG. 5.

With reference to FIG. 6 is illustrated an embodiment where the pivotable section 32' arranged in section 112 is pivoted into a position as illustrated with reference to FIGS. 3 and 4 whereas in section 110 the pivotable section 32' has not been operated such that it remains in a position as illustrated in FIGS. 1 and 2. It should in this connection be emphasized that the pivotable section 32' may be operated independently of each other and furthermore, that they may be positioned in any position between the cross section illustrated with reference to FIG. 2 and in cross section illustrated with reference to FIG. 4. It is also contemplated (though not illustrated) that the pivotable section may pivot around a forward edge (42).

In FIG. 7 is illustrated a cross section through a trawl door according to embodiments of the present invention where some or all of the features explained above are incorporated into the trawl door but additionally a bulb 52 is illustrated mounted on an intermediate foil 22. The bulb causes the water flow between adjacent foils 12,22 to speed up and create extra lift on the rear side of a bulb 52 in the flow direction of the water. In this manner the bulb 52 further increases the lift of the overall trawl door.

FIG. 8 illustrates an embodiment where a first cord (71) may be defined as passing through the foremost edge of (2) of the first forward foil (14) and the rear edge (44) of the first rearward foil (34), and a second cord (72) passing through the forward edge (4) of the second forward foil (12) and the rearward edge (46) on the second rearward foil (32), where the angle between the first and second cords (71,72) may be +/−20° relative to the cords (71,72) being parallel.

The angle between the cord lines may vary, such that the channel between the inner and outer foils may be shaped as a funnel with the larger opening of the funnel facing in the towing direction or opposite the towing direction. In this manner it is possible to create a substantially different overall lift, without sacrificing the superior lift properties as discussed above with respect to the relationship between the separate foils. The variation in the angle between the cord lines may be particularly useful when towing the device at low or high speeds, but also to compensate for currents in the body of water through which the devices are towed.

Furthermore, the inlet distance of the channel (64) measured at the foremost edges between the inner and outer array of foils is designated "X". The corresponding measurement between the rearmost edges of the inner and outer foils with respect to the outlet opening is called "Y" (channel outlet). Various embodiments may be contemplated where the relationship/ratio between X and Y varies. In embodiments the relationship may be described as 0.5≤Y/X≤2. In the illustrated embodiment in FIG. 8, the ratio or relationship between Y and X is approximately 0.8.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A spreading device for trawl fishing, seismic survey operations and other water activities where it is desirable to keep distance between two sides of a towed device,
   the spreading device having at least one section,
   where each section has at least four foils,
   in use an inner set of the at least four foils comprising at least a first forward foil and a first rearward foil and an outer set of the at least four foils comprising at least a second forward foil and a second rearward foil,
   where all the at least four foils have a front surface and a rear surface,
   the surfaces each being defined by a front edge and a rear edge and two side limitations,
   where the front edge of the first forward foil and the front edge of the second forward foil are arranged on a first radial extending from a center point where the rear edge of the first forward foil and the rear edge of the second forward foil are arranged on a second radial extending from the center point and
   where the front edge of the first rearward foil and the front edge of the second rearward foil are arranged on a third radial extending from the center point and where the rear edge of the first rearward foil and the rear edge of the second rearward foil are arranged on a fourth radial extending from the center point.

2. The spreading device according to claim 1, wherein the combined angle α between the first radial and the second radial and the angle β between the third radial and the fourth radial is larger than the angle µ between the first radial and the fourth radial.

3. The spreading device according to claim 1, wherein the inner set of foils and/or the outer set of foils each comprises one or more intermediate foils, where the front and rear edges of intermediate foils of the inner set of foils and the outer set of foils are arranged on common radials extending from the fictive center through front and rear edges respectively.

4. The spreading device according to claim 3, wherein a front part of the foremost intermediate foil is overlapped by a rear part of the first or second forward foils, and where a rear part of an intermediate foil overlaps a front part of either the first or second rearward foils.

5. The spreading device according to claim 1, wherein the rearward foil or a part of the rearward foil, of the outer set of foils is pivotable about an axle provided along the rear edge of the rearward foil, where the pivotable action of the rearward foil or the section of the rearward foil may be controlled by an actuator.

6. The spreading device according to claim 1, wherein at least some or all the at least four foils are arc-shaped.

7. The spreading device according to claim 1, wherein one or more of the at least four foils, not being the first or second forward foils are provided with a bulb on a surface facing away from the fictive center C, where the foremost part of the bulb is arranged at a distance corresponding to between 5% and 15% of the length between the front edge and rear edge of the foil, measured from the front edge of the foil.

8. The spreading device according to claim 1, wherein the angle π between a first axis passing through the foremost edge of the outer foremost foil and the rear edge of the inner rearmost foil and a second axis passing through the rear edge of the inner rearmost foil and the rear edge of the outer rearmost foil is between 70° and 110°.

9. The spreading device according to claim 1, wherein a first cord may be defined as passing through the foremost edge of the first forward foil and the rear edge of the first rearward foil, and a second cord passing through the forward edge of the second forward foil and the rearward edge on the second rearward foil, where the angle between the first and second cords may be +/−20° relative to the cords being parallel.

10. The spreading device according to claim 1, wherein the inlet distance of the channel measured at the foremost edges between the inner and outer array of foils is designated "X" and the corresponding measurement between the rearmost edges of the inner and outer foils with respect to the outlet opening is called "Y" or channel outlet, where the ratio between X and Y may be described as 0.5≤Y/X≤2.

* * * * *